Patented Nov. 11, 1941

2,262,686

UNITED STATES PATENT OFFICE 2,262,686

PRODUCTION OF ESTERS OF THIOCARBOXYLIC ACIDS

Lucas P. Kyrides, Webster Groves, and Ferdinand B. Zienty, St. Louis, Mo., assignors to Monsanto Chemical Company, St. Louis, Mo., a corporation of Delaware No Drawing. Application May 31, 1940, Serial No. 338,240

7 Claims. (Cl. 260—481)

The present invention relates to the production of esters of thiodicarboxylic acids of the type represented by thiodiglycolate esters and refers particularly to an improved method for the production of esters of such acids by the reaction of esters of monohalogenated monocarboxylic acids with sodium sulfide.

Heretofore esters of thiodiglycolic acid were prepared by several methods, which were briefly as follows:

1. Thiodiglycolic acid was esterified with ethyl alcohol in the presence of hydrochloric acid to give ethyl thiodiglycolate (Schulze, Zeitschrift für Chemie, 1865, page 78).

2. Ethyl chloroacetate was reacted with potassium hydrogen sulfide (KHS) in ethyl alcohol, (Heintz, Annalen, 1866, vol. 140, page 226 and Wislicenus, Annalen, vol. 146, page 153, and Zeitschrift für Chemie, 1865, page 624). When an alcoholic solution of potassium hydrogen sulfide is added to ethyl chloroacetate, ethyl thioglycolate ($C_2H_5$–OOC–$CH_2$–SH) is formed but if the addition is made in the opposite manner, diethyl thiodiglycolate is the chief product.

3. Diethyl thiodiglycolate was obtained in the decomposition of the mercury salt of ethyl thioglycolate ($C_2H_5$–OOC–$CH_2$–S)$_2$Hg (Wislicenus, Annalen, 1867, vol. 146, page 153).

4. Sodium chloroacetate was reacted with sodium sulfide to obtain a complex product that yielded on heating a small proportion of methyl thiodiglycolate (Delisle, Berichte, 1892, vol. 25, page 2452).

5. Thiodiglycolic acid chloride was reacted with methyl alcohol to obtain methyl thiodiglycolate. (Anschutz and Biernaux, Annalen, 1893, vol. 273, page 69).

In the foregoing methods heretofore used for the preparation of thiodoglycolic acid esters the starting material for the synthesis was thiodiglycolic acid or a derivative thereof, except in the case of the second and fourth methods, in which the starting materials were ethyl chloroacetate, and sodium chloroacetate, respectively. Methods based on esterification of thiodiglycolic acid are complicated by the fact that thiodiglycolic acid is difficult to isolate in pure anhydrous form because of its extremely high solubility in water. In the preparation of alkyl esters of thiodiglycolic acid by the reaction of an alkyl ester of chloroacetic acid with potassium hydrogen sulfide, according to the second method, the maximum theoretical yield is only one-half that of the amount obtainable from the potassium hydrogen sulfide since half of the potassium hydrogen sulfide is lost as hydrogen sulfide, as is obvious from the following equation of the reaction:

2KHS+2Cl—$CH_2$—COO—R→

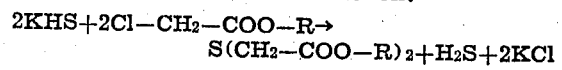

In this reaction the intermediate product is the thioglycolic ester and its conversion to the thiodiglycolic acid ester is not complete in the reaction. In preparing dimethyl thiodiglycolate according to the fourth method outlined hereinabove the yields are low and the number of operations involved make the process industrially unfeasible.

It is an object of the present invention to provide a method of preparing esters of thiodiglycolic and similar thiodicarboxylic acids directly from a monohalogenated monocarboxylic acid ester, thus obviating the intermediate production and isolation of the thiodicarboxylic acid and its subsequent esterification to obtain the desired ester. Thus it is an object of the invention to improve the yield of thiodicarboxylic acid ester obtainable from a determinate amount of monohalogenated monocarboxylic acid. Other objects and advantages of the invention, some of which are hereinafter referred to specifically, will be apparent from the following description.

It has now been discovered that esters of thiodiglycolic acid and similar thiodicarboxylic acids of the general formula

in which X is an alkylene radical and R is a hydrocarbon radical, can be made by direct reaction of sodium sulfide in an inert organic solvent such as acetone with the corresponding monohalogenated monocarboxylic acid ester of the formula R–OOC–X–Hal in which Hal represents a halogen atom and R and X represent hydrocarbon and alkylene radicals, respectively. Thus, diethyl thiodiglycolate can be prepared by reaction of sodium sulfide with ethyl chloroacetate in acetone.

It is known that thiodiglycolic acid can be made by the reaction of sodium chloroacetate in an aqueous medium with sodium sulfide (Lovén, Berichte, 1884, vol. 17, page 2818) and by the reaction of potassium chloroacetate in an aqueous medium with potassium sulfide (Andreasch, Berichte, 1879, vol. 12, page 1390). The reaction of ethyl chloroacetate with sodium sulfide in aqueous media, however, gives low yields of diethyl thiodiglycolate, namely, of the order of 40% of the theoretical. It was unexpected that the reaction in an inert organic solvent would produce almost quantitative yields of the thiodiglycolic acid ester and that the process would be attended with the other advantages observed.

The advantages of the process of producing thiodicarboxylic acid esters according to the present invention are obvious. It is easier to esterify chloroacetic acid than thiodiglycolic acid and the yields are greater. Since the reaction of the chloroacetic acid ester with sodium sulfide according to the present invention results in almost quantitative yields, the yield of ester based on the amount of chloroacetic acid used initially is greater than in the case of the process involving the preparation of thiodiglycolic acid and its subsequent esterification, and the process is much simpler. The process is particularly applicable to the production of esters of thiodicarboxylic acids which are difficult to make by esterification of the thiodicarboxylic acid with an alcohol; for example, it is difficult to esterify thiodiglycolic acid with cyclohexanol but the esterification reaction of cyclohexanol and chloroacetic acid proceeds readily, the yields are good, the purification presents no great difficulties and the recovery of reactants is a simple matter.

The method of practicing the invention is illustrated in the examples which follow:

*Example 1.—*Dibutyl Thiodiglycolate

Chloroacetic acid is refluxed with a small excess of n-butyl alcohol containing a small proportion of concentrated hydrochloric acid as catalyst. This mixture is then neutralized with sodium hydroxide and the butyl chloroacetate may be recovered by fractional distillation. However, the ester need not be isolated since the entire neutralized reaction mixture can be used conveniently and more economically as such.

The butyl chloroacetate obtained by purification of the reaction mixture, or the unpurified neutralized reaction mixture, is then added to a suspension of finely powdered sodium sulfide hydrate ($Na_2S \cdot 9H_2O$) in acetone. If desired, the water of hydration may be removed by gentle heating as is shown in Example 2 hereinafter. The suspension should contain an amount of sodium sulfide equivalent stoichiometrically to the butyl chloroacetate used or approximately equivalent to the amount of chloroacetic acid used in the esterification, if the esterification reaction mixture is used, in accordance with the following equation:

$$2C_4H_9-OOC-CH_2Cl + Na_2S \rightarrow (C_4H_9-OOC-CH_2)_2S + 2NaCl$$

The amount of acetone is relatively unimportant. Generally an amount equal to that of the weight of sodium sulfide is ample, and the sodium sulfide will be partly in solution and partly in suspension in the acetone.

The mixture is thereafter stirred and heated under gentle reflux for several hours, cooled, and the salts are subsequently removed therefrom by washing with water. If desired the acetone and any butyl alcohol may be recovered by distillation before the washing procedure. The dibutyl thiodiglycolate may be taken up with benzene and then distilled or it may be recovered by direct distillation. It has a boiling point of approximately 131 to 133° C. at a pressure of 2 to 3 mm. of mercury.

*Example 2.—*Dicyclohexyl Thiodiglycolate

A mixture of 0.4 mol of cyclohexyl chloroacetate, 0.2 mol of finely powdered sodium sulfide hydrate ($Na_2S \cdot 9H_2O$) and 25 grams of cyclohexanol is charged into a tared flask. The mixture is stirred vigorously and heated at 30° to 35° C. under a pressure of 8 to 10 mm. until the loss in weight is about 32.4 grams, corresponding approximately to the water of hydration present in the sodium sulfide. This will require about 12 to 14 hours. A 25 cc. portion of acetone is then added and the mixture is refluxed with agitation for about 15 to 20 hours, after which is is cooled and the salts are removed by washing with two 200 cc. portions of water. The acetone may be removed by distillation before the washing if desired. The remaining dicyclohexyl thiodiglycolate is then taken up with a small amount of benzene, separated from any residual water and distilled in vacuum. Its boiling point is approximately 182° to 184° C. at a pressure of 3 mm. of mercury. The product is a colorless oil with a perceptible odor. The yield is in excess of 90% of the theoretical.

The procedure of the present invention may be used to prepare esters of thiodicarboxylic acids of the general formula:

$$R-OOC-X-S-X-COO-R$$

in which X is an alkylene radical and R is a hydrocarbon radical. Thus for example esters of the following acids may be prepared:

Thiodiglycolic acid $S(CH_2-COOH)_2$

Alpha-thiodilactic acid $S(CH(CH_3)-COOH)_2$

Gamma-thiodibutyric acid
$$S(CH_2CH_2CH_2-COOH)_2$$

The esters may be simple alkyl esters such as the dimethyl, diethyl, dibutyl, diamyl, dihexyl, dioctyl, didodecyl and the like or cycloalkyl esters such as dicyclohexyl, di-(methyl cyclohexyl) and the like, aromatic and aralkyl esters such as phenyl and benzyl, and esters whose alcohol radicals may be considered the equivalents of hydrocarbon radicals such as those of tetrahydrofurfuryl alcohol and the like. The boiling points of some of these esters are as follows:

| | |
|---|---|
| Di-n-butyl thiodiglycolate | 190°/5 mm.<br>205°/18 mm. |
| Diamyl thiodiglycolate | 159-175°/8 mm.<br>202°/18 mm. |
| Di-2-ethylbutyl thiodiglycolate | 228°/18 mm.<br>184-195°/2-3 mm. |
| Di-n-octyl thiodiglycolate | 360-365°/760 mm. |
| Di-2-ethylhexyl thiodiglycolate | 345-348°/760 mm.<br>203-204°/9 mm. |
| Dibenzyl thiodiglycolate | 340-350°/760 mm. |
| Dicyclohexyl thiodiglycolate | 245-250°/30 mm.<br>182°-184°/3 mm. |
| Ditetrahydrofurfuryl thiodiglycolate | 203-205°/2 mm. |

Several of the foregoing compounds are new compounds which have not heretofore been prepared.

The monohalogenated monocarboxylic acid esters which are used may be monochlorinated, monobrominated or monoiodinated derivatives. However, because the monochlorinated compounds are more readily available and are cheaper, this description is directed particularly to their use in the process. Instead of using sodium sulfide in the reaction, alkali-metal sulfides such as potassium sulfide may be used in general. The hydrated or the anhydrous salts may be used, but the anhydrous are preferred. If the hydrated salts are used, the water of hydration may be removed during reaction by gentle heating as in Example 2, if desired.

Acetone is the preferred solvent for the reaction, although inert organic solvents in general may be used. Dioxane, methyl ethyl ketone, diethyl ether, dibutyl ether and the like are suitable. Alcohols may be used as solvents, but in general are not desirable because of the possibility of their reacting with sodium sulfide or taking part in exchange reactions. When present in small proportions in an esterification mixture, as in Example 1, they do not have a substantial effect on the reaction. However in increased amounts the particular alcohol used in esterification of the monohalogenated monocarboxylic acid has a beneficial effect in increasing the yield of desired ester. By the term "inert" as applied to solvents and as used herein is to be understood a solvent which itself takes no part in the main course of the reaction proper. Generally the solvent should be one in which the sodium or potassium sulfide is soluble to some extent; hence hydrocarbon solvents are not desirable. It is not necessary that all the sodium sulfide used in the reaction be initially soluble in the volume of solvent used.

Inasmuch as the foregoing description comprises preferred embodiments of the invention it is to be understood that these are merely illustrative and that modifications and variations thereof in accordance with the principles herein set forth and known to the art may be made without departing substantially from the scope of the invention, which is defined in the appended claims.

What is claimed is:

1. The method of producing an ester of a thiodicarboxylic acid of the general formula

R—OOC—X—S—X—COO—R in which X is an alkylene radical and R is a hydrocarbon radical, which involves the reaction of an alkali-metal sulfide in an inert organic solvent therefor with a monohalogenated monocarboxylic acid ester of the general formula, R—OOC—X—Hal, in which Hal is a halogen atom and R and X are hydrocarbon and alkylene radicals, respectively.

2. The method of producing an ester of a thiodicarboxylic acid of the general formula

R—OOC—X—S—X—COO—R in which X is an alkylene radical and R is a hydrocarbon radical, which involves the reaction of an alkali-metal sulfide in an inert organic solvent therefor with a chloromonocarboxylic acid ester of the general formula R—OOC—X—Cl 3. The method of producing an ester of thiodiglycolic acid which comprises heating an ester of chloroacetic acid with an alkali-metal sulfide in an inert organic solvent therefor.

4. The method of producing an ester of thiodiglycolic acid which comprises heating an ester of chloroacetic acid with sodium sulfide in acetone.

5. The method of producing dibutyl thiodiglycolate which comprises heating butyl chloroacetate with sodium sulfide in acetone.

6. The method of producing dicyclohexyl thiodiglycolate which comprises heating cyclohexyl chloroacetate with sodium sulfide in a mixture of acetone and cyclohexanol.

7. Dicyclohexyl thiodiglycolate.

LUCAS P. KYRIDES.
FERDINAND B. ZIENTY.